Jan. 7, 1941.  L. J. HIBBARD  2,227,498

LOCOMOTIVE CONTROL SYSTEM

Filed Nov. 29, 1939   3 Sheets—Sheet 1

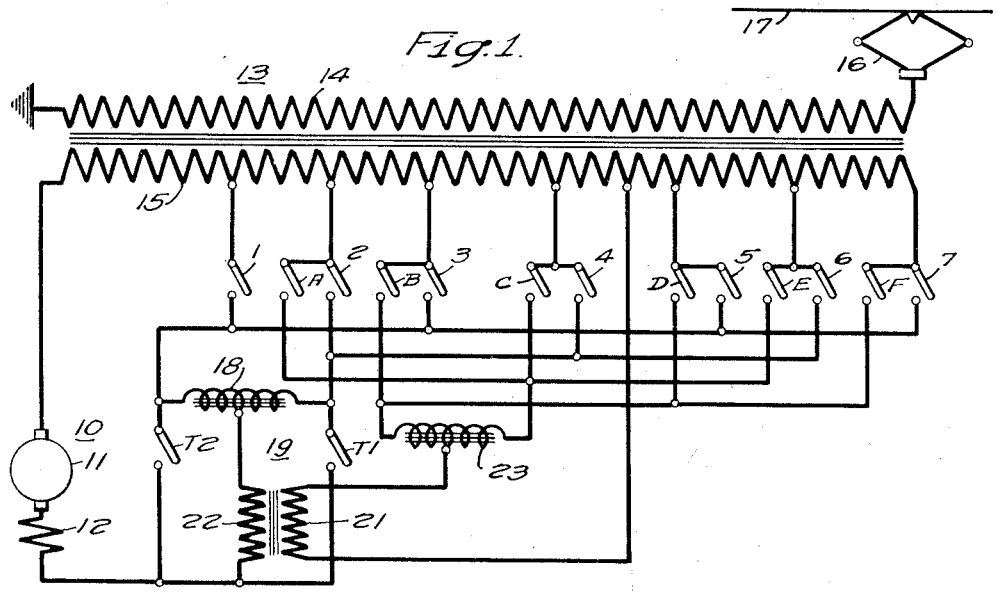

| Step | Switches | | | | | | | | | | | | | |
|---|---|---|---|---|---|---|---|---|---|---|---|---|---|---|
| | 1 | 2 | 3 | 4 | 5 | 6 | 7 | A | B | C | D | E | F | T1 | T2 |
| 1 | o | o | | | | | | o | o | | | | | | |
| 2 | o | o | | | | | | | o | o | | | | | |
| 3 | o | o | | | | | | | | o | o | | | | |
| 4 | o | o | | | | | | | | | o | o | | | |
| 5 | o | o | | | | | | | | | | o | o | | |
| 6 | o | o | | | | | | | | | | o | o | o | |
| 7 | | o | | | | | | | | | | | | o | |
| 8 | | o | o | | | o | o | | | | | | | o | |
| 9 | | o | o | | | o | o | | | | | | | | |
| 10 | | o | o | | | | | | | o | o | | | | |
| 11 | | o | o | | | | | | | | o | o | | | |
| 12 | | o | o | | | | | | | | | o | o | | |
| 13 | | o | o | | | | | | | | | | o | o | |
| 14 | | o | o | | | | | | | | | | o | o | o |
| 15 | | o | | | | | | | | | | | | | o |
| 16 | | | o | o | | o | o | | | | | | | | o |
| 17 | | | o | o | | o | o | | | | | | | | |
| 18 | | | o | o | | | | | | | o | o | | | |
| 19 | | | o | o | | | | | | | | o | o | | |
| 20 | | | o | o | | | | | | | | | o | o | |
| 21 | | | o | o | | | | | | | | | | o | o |
| 22 | | | o | o | | | | | | | | | | o | o | o |
| 23 | | | o | | | | | | | | | | | | | o |

Fig. 2B.

| Step | Switches | | | | | | | | | | | | | |
|---|---|---|---|---|---|---|---|---|---|---|---|---|---|---|
| | 1 | 2 | 3 | 4 | 5 | 6 | 7 | A | B | C | D | E | F | T1 | T2 |
| 24 | | | o | o | | o | o | | | | | | | o | |
| 25 | | | o | o | | | | | o | o | | | | | |
| 26 | | | o | o | | | | | | o | o | | | | |
| 27 | | | o | o | | | | | | | o | o | | | |
| 28 | | | o | o | | | | | | | | o | o | | |
| 29 | | | o | o | | | | | | | | | o | o | |
| 30 | | | o | o | | | | | | | | | o | o | o |
| 31 | | | o | | | | | | | | | | | | o |
| 32 | | | | o | o | o | o | | | | | | | | o |
| 33 | | | | o | o | o | o | | | | | | | | |
| 34 | | | | o | o | | | | | o | o | | | | |
| 35 | | | | o | o | | | | | | o | o | | | |
| 36 | | | | o | o | | | | | | | o | o | | |
| 37 | | | | o | o | | | | | | | | o | o | |
| 38 | | | | o | o | | | | | | | | o | o | o |
| 39 | | | | o | | | | | | | | | | | o |
| 40 | | | | | o | o | o | o | | | | | | | o |
| 41 | | | | | o | o | o | o | | | | | | | |
| 42 | | | | | o | o | | | | o | o | | | | |
| 43 | | | | | o | o | | | | | o | o | | | |
| 44 | | | | | o | o | | | | | | o | o | | |
| 45 | | | | | o | o | | | | | | | o | o | |

WITNESSES:
E. A. M?Closkey.
M?Chilcoat

INVENTOR
Lloyd J. Hibbard.
BY
Crawford
ATTORNEY

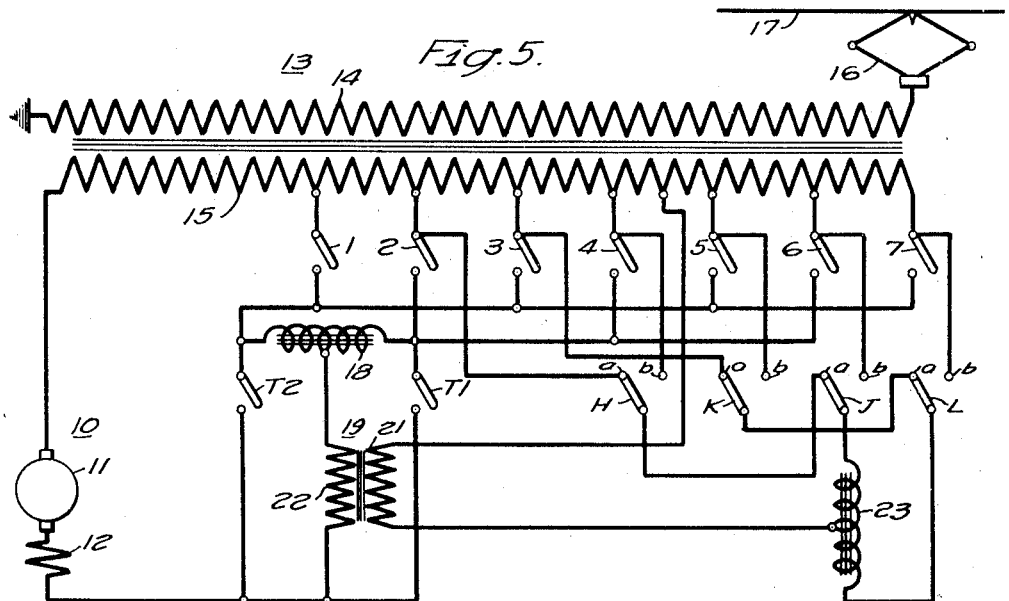

Patented Jan. 7, 1941

2,227,498

UNITED STATES PATENT OFFICE 2,227,498

LOCOMOTIVE CONTROL SYSTEM

Lloyd J. Hibbard, Forest Hills, Pa., assignor to Westinghouse Electric & Manufacturing Company, East Pittsburgh, Pa., a corporation of Pennsylvania Application November 29, 1939, Serial No. 306,673

10 Claims. (Cl. 172—179)

My invention relates, generally, to control systems and, more particularly, to systems for controlling the operation of electric locomotives.

Electric locomotives which are driven by alternating current motors of the series type are usually accelerated by connecting the motors to successive taps on a power transformer, thereby increasing the voltage applied to the motors in a step-by-step manner. One of the problems involved in performing the tap-changing operations is to provide a sufficient number of steps with a relatively small amount of switching equipment. Another problem is to reduce sag-backs in the tractive effort of the motors during the tap-changing operations and to prevent excessive power surges during the switching operations.

One object of my invention is to provide a large number of accelerating steps with a relatively small amount of switching equipment in a tap-changing control system.

Another object of my invention is to prevent power surges during the switching operations of a tap-changing control system.

A further object of my invention is to provide a tap-changing system for accelerating an electric motor in which substantially no sag-back occurs in the tractive effort of the motor during the tap-changing operations.

A more general object of my invention is to provide a tap-changing system suitable for the heavy duty service encountered on large electric locomotives.

Other objects of my invention will be explained fully hereinafter or will be apparent to those skilled in the art.

According to the present invention, the locomotive is controlled by varying the voltage applied to the traction motor by means of a plurality of main tap switches and a preventive coil. A notching or buck-boost transformer is used to divide each of the main notches in several equal parts. The voltage applied to the primary of the notching transformer is controlled by a plurality of auxiliary tap switches connected to certain of the main transformer taps. The auxiliary switches are so operated that the voltage of the secondary of the notching transformer changes from maximum in one direction through zero to maximum in the opposite direction. The voltage of the notching transformer is varied through its complete range for each pair of main tap switches and the transition from one pair of main switches to the next is made without appreciable tractive effort sags or curent surges.

For a fuller understanding of the nature and objects of the invention, reference may be had to the following detailed description, taken in conjunction with the accompanying drawings, in which:

Figure 1 is a schematic diagram of a motor control system embodying the invention;

Figs. 2A and 2B constitute a sequence chart showing the sequence of operation of the switches illustrated in Fig. 1;

Fig. 5 is a schematic diagram of another modification of the invention; and

Fig. 6 is a sequence chart for the switches shown in Fig. 5.

Figures 3, 4:
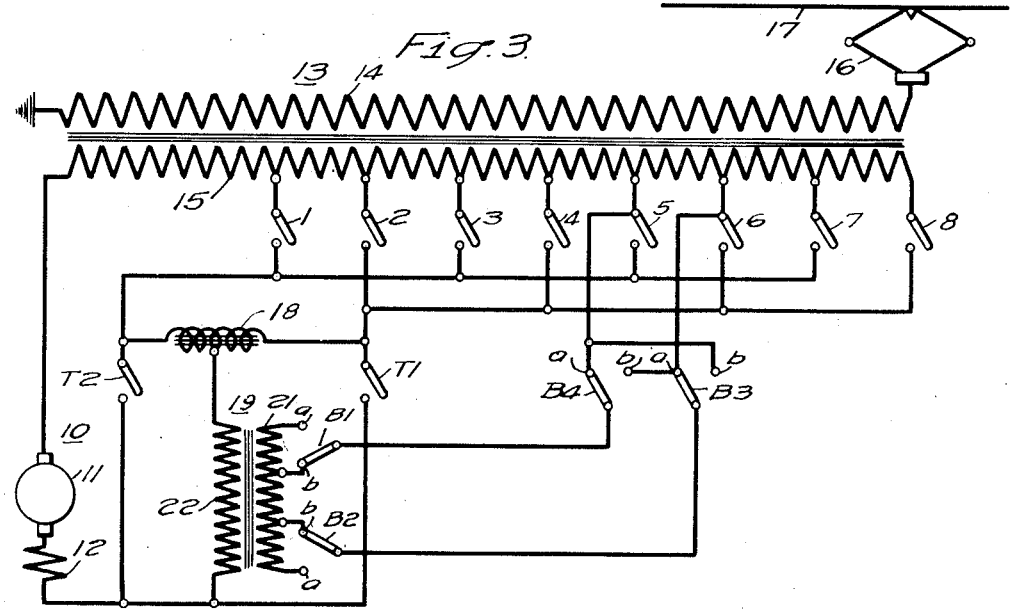
Fig. 3 is a schematic diagram of a modified form of the invention.
Fig. 4 is a chart showing the sequence of operation of the switches illustrated in Fig. 3.

Referring now to the drawings and, particularly, to Fig. 1, the system shown therein comprises a motor 10 having an armature winding 11 and a series field winding 12, a main transformer 13 having a primary winding 14 and a secondary winding 15, and a pantograph current collector 16 which engages a trolley conductor 17. The trolley conductor 17 may be energized from any suitable source of power such as a power generating station (not shown).

It will be understood that more than one traction motor may be provided for propelling the locomotive, if desired. In order to simplify the drawings, only one motor has been shown in the present application. The acceleration of the locomotive is controlled by varying the voltage applied to the traction motor circuit by means of seven main tap switches numbered from 1 to 7, inclusive, and a main preventive coil 18.

An auxiliary or notching transformer 19, having a primary winding 21 and a secondary winding 22, is used to divide each of the main notches in four equal parts. The voltage applied to the primary of the notching transformer is controlled by six auxiliary tap switches designated by the letters A to F, inclusive. One terminal of the primary winding 21 of the notching transformer is connected to a tap approximately at the midpoint of the main transformer 13 while the other terminal may be moved by means of the switches A to F from one end of the transformer to the other, thereby changing the voltage from maximum in one direction through zero to maximum in the opposite direction. The voltage of the notching transformer is varied through its complete range for each pair of the main or numbered tap switches. The transition from one pair of numbered switches to the next is made without appreciable tractive effort sags or current surges.

An auxiliary preventive coil 23 is provided for use in conjunction with the auxiliary tap switches A to F, thereby permitting any two of these switches which are connected to opposite terminals of the preventive coil to be closed at the same time. Likewise, any two of the main tap switches, 1 to 7, which are connected to opposite terminals of the main preventive coil 18 may be closed at the same time. The tap switches may be so interlocked in the usual manner that the simultaneous closing of any two switches which are connected to a common bus is prevented.

In order to reduce the duty imposed on the tap-changing switches, a pair of transition switches T1 and T2 is provided. These transition switches are so operated that the tap switches are opened under no-load equi-potential conditions during the notching sequence as transitions are made from one transformer tap to the next. Likewise, the tap switches are closed under no-load equi-potential conditions during the notching operations.

In order that the method of making a transition from one pair of tap switches to the next may be more clearly understood, reference may be had to the sequence chart shown in Figs. 2A and 2B which illustrates the sequence of operation of the foregoing switches. As shown in the sequence chart, the main tap switches 1 and 2 are closed at the start of the notching operations, thereby placing the mid-point of the main preventive coil 18 at a potential midway between the transformer taps to which the switches 1 and 2 are connected. With the auxiliary tap switches A and B closed, the voltage in the secondary winding 22 of the notching transformer 19 is just one-half of the voltage between the taps to which the switches 1 and 2 are connected and is in a bucking direction. Therefore, the voltage applied to the motor 10 is equal to the voltage of the tap to which the switch 1 is connected.

The voltage of the notching transformer 19 is now varied by closing the lettered switches in the order indicated in the sequence chart until the switches E and F are closed. The notching transformer secondary voltage is now of the same value as when switches A and B were closed but it is in the opposite direction and boosts the motor voltage. Therefore, the voltage applied to the motor 10 is equal to the voltage of the transformer tap to which the switch 2 is connected.

If the transition switch T1 is now closed to shunt the preventive coil 18 and the transformer 19, there will be no change in voltage conditions and switches 1, E, and F can be opened. Under these conditions, all of the load current is carried momentarily by switches 2 and T1. Therefore, the switches 1, E, and F are opened under no-load equi-potential conditions. If the switch 3 is now closed, it will merely carry the exciting current for the preventive coil and notching transformer without affecting the motor circuit. Therefore, the switch 3 is closed under no-load conditions.

The notching transformer secondary 22 is now across one-half of the preventive coil 18 which is the same voltage as before the switches E and F were opened, but since the connections to the main preventive coil were reversed, the voltage across the notching transformer is reversed. Therefore, the voltage across the primary is correct for the switches A and B to close. In other words, the voltage with switches 1 and 2 and E and F closed is the same as with switches 2 and 3 and A and B closed. Therefore, the switch T1 can now be opened without any appreciable effect on the voltage and the transition is complete.

The auxiliary switches A to F are again closed in the same sequence as before until the switches 2 and 3 and E and F are closed, thereby reaching the voltage of the transformer tap to which the switch 3 is connected. At this time the transition switch T2 is closed and the motor current flows through the switches 3 and T2. Transition is then made to the switches 3 and 4 and A and B in a manner similar to the transition from switches 1 and 2 under no-load equi-potential conditions.

The notching is continued as indicated in the sequence chart with the transition switches T1 and T2 closing alternately until the desired operating voltage is reached or until the main switches 6 and 7 and the auxiliary switches E and F are closed. Likewise, the switches are operated in the reverse order during a reduction in the voltage applied to the traction motor.

In the modification of the invention illustrated in Fig. 3, in which similar parts are designated by the same reference character as in Fig. 1, the variations in the voltage of the notching transformer 19 are obtained by providing a plurality of taps on the primary winding 21 of the notching transformer and a pair of double-throw switches B1 and B2 for connecting predetermined portions of the winding 21 across a certain potential obtained from the main transformer secondary winding 15. In this manner the ratio of transformation of the transformer 19 is actually changed to vary the voltage applied to the motor 10 instead of connecting the primary winding 21 to different taps on the main transformer 15 as was done in the system illustrated in Fig. 1.

A pair of double-throw switches B3 and B4 is provided for reversing the polarity of the notching transformer 19, thereby changing its operation from a bucking to a boosting effect as desired. The transition switches T1 and T2 function in the manner previously described to shunt the preventive coil 18 and the notching transformer 19 from the motor circuit, thereby permitting the tap switches to be opened and closed under no-load conditions as in the system previously described. As indicated in the sequence chart shown in Fig. 4, the main tap switches 1 and 2 are closed and switches B1 and B2 are on position b while the switches B3 and B4 are on position a at the start of the notching operations. With the switches B1, B2, B3, and B4 in the foregoing positions, the voltage relations are such that the maximum bucking effect is obtained and the potential actually applied to the motor 10 is equal to the potential of the transformer tap to which the switch 1 is connected.

By operating the switches B1 and B2 in the manner shown in the sequence chart, the number of turns of the primary winding 21 utilized is changed to change the ratio of transformation of the notching transformer 19, thereby reducing the bucking effect and increasing the voltage applied to the motor 10. As previously explained, the switches B3 and B4 are utilized to change the polarity of transformer 19 when it is desired to change from a bucking to a boosting effect and vice versa during the notching operations.

In this manner the voltage applied to the motor is increased step-by-step until it is equal to the potential of the tap to which the switch 2 is connected. Therefore, the switch T1 may be closed at this time and transition made from the switches 1 and 2 to the switches 2 and 3 under no-load equi-potential conditions in the same manner as in the system illustrated in Fig. 1. Likewise, the auxiliary switches B1, B2, B3 and B4 may be operated to their initial positions during the transition period, thereby placing all of the switches in the correct position for a repetition of the notching operations.

When the voltage applied to the motor has been increased to that of the transformer tap to which the switch 3 is connected, the transition switch T2 is closed and transition made from the switches 2 and 3 to the switches 3 and 4 as indicated in the chart. The notching operation may be continued in the foregoing manner until the maximum voltage is applied to the motor. The transition switches T1 and T2 are closed alternately and the operation of the switches B1, B2, B3, and B4 is repeated in the same sequence as shown in the portion of the chart illustrated. Therefore, it is believed to be unnecessary to show a complete sequence chart in the present application.

In the modification of the invention illustrated in Fig. 5, four double-throw auxiliary tap switches H, J, K, and L are provided instead of the six switches A to F, inclusive, utilized in the system shown in Fig. 1. In this manner the number of auxiliary switches required is reduced without reducing the number of voltage steps provided.

As shown in the chart in Fig. 6, the main switches 1 and 2 are closed at the start of the notching operation and the double-throw switches H, J, K, and L are all on position *a*. In this manner the primary winding 21 of the notching transformer 19 is so connected by means of the preventive coil 23 and the switches H, J, K, and L to the secondary winding 15 of the main transformer that the voltage actually applied to the motor 10 is equal to the potential of the tap to which the switch 1 is connected, as in the systems previously described.

By operating the switches H, J, K, and L in the manner indicated in the sequence chart, the voltage applied to the motor is increased until it is equal to the potential of the top to which the switch 2 is connected. At this time, the switch T1 may be closed and a transition made from switches 1 and 2 to 2 and 3 in the manner hereinbefore described. The notching operation is then continued until the potential applied to the motor is equal to that of the tap to which the switch 3 is connected, at which time the transition switch T2 is closed and transitition made from switches 2 and 3 to 3 and 4.

The operation of the switches H, J, K, and L is repeated between each transition period as indicated in the sequence chart to increase the motor voltage step-by-step by means of the notching transformer 19. Since a continuation of the notching operation merely involves a repetition of the operation of the switches in the same sequence, it is believed to be unnecessary to show a chart for the complete operation in the present application.

It will be understood that the operation of the tap-changing switches shown in the various modifications of the invention herein illustrated, may be controlled by means of one or more drum controllers which are operated in a manner to give the desired sequence of operation of the tap-changing and transition switches. Since such a system forms no part of the present invention, it will not be described in the present application.

From the foregoing description, it is apparent that I have provided systems for controlling the acceleration of alternating current motors in which a relatively large number of accelerating steps is obtained with a relatively small amount of switching equipment. Furthermore, since transition is made from one step to the next during the accelerating period under equi-potential conditions, no sag-back occurs in the tractive effort developed by the motors. Likewise, power surges are prevented during the switching operations since the switches are opened and closed under no-load conditions.

Since numerous changes may be made in the above-described construction and different embodiments may be made without departing from the spirit and scope thereof, it is intended that all matter contained in the foregoing description or shown in the accompanying drawings shall be interpreted as illustrative and not in a limiting sense.

I claim as my invention:

1. In a control system, in combination, a main transformer, a motor energized from said transformer, a plurality of switches for changing taps on said transformer to vary the voltage of the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, additional switches for connecting said primary winding to successive taps on said transformer, and a transition switch for shunting the preventive coil and the auxiliary transformer from the motor circuit during transition from one pair of tap switches to another.

2. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, additional switches for connecting said primary winding to successive taps on said main transformer, and a pair of transition switches for shunting the preventive coil and the auxiliary transformer from the motor circuit during transition from one pair of tap switches to another, said transition switches being operated alternately.

3. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the midpoint of said preventive coil and the other terminal connected in the motor circuit, additional switches for connecting said primary winding to successive taps on said main transformer, and a pair of transition switches for shunting the preventive coil and the auxiliary transformer from the motor circuit during transition from one pair of tap switches to another, one of said transition switches being connected to one of said common buses and the other transition switch being connected to the other common bus, said transition switches being operated alternately.

4. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, additional switches for connecting said primary winding to successive taps on said main transformer, a part of said additional switches being connected to one bus and the remainder of said additional switches being connected to another bus, and an additional preventive coil connected across said buses.

5. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, additional switches for connecting said primary winding to successive taps on said main transformer, a part of said additional switches being connected to one bus and the remainder of said additional switches being connected to another bus, and an additional preventive coil connected across said buses, the primary winding of said auxiliary transformer having one terminal connected to the mid-point of said additional preventive coil and the other terminal connected to the main transformer.

6. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, and a plurality of double-throw switches for connecting said primary winding to said main transformer independently of said tap switches.

7. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, said primary winding having a plurality of taps thereon, and a plurality of switches for connecting said taps to the main transformer.

8. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, and a plurality of double-throw switches for connecting predetermined portions of said primary winding to a portion of the main transformer.

9. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, a plurality of double-throw switches for connecting said primary winding to said main transformer, and an additional preventive coil connected across a pair of said double-throw switches and in the circuit for said primary winding.

10. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, a plurality of double-throw switches for connecting said primary winding to said main transformer, and an additional preventive coil connected across a pair of said double-throw switches and in the circuit for said primary winding, one terminal of the primary winding being connected to the mid-point of said preventive coil and the other terminal being connected to the main transformer.

LLOYD J. HIBBARD.